(12) United States Patent
Schmidt et al.

(10) Patent No.: US 9,331,368 B2
(45) Date of Patent: May 3, 2016

(54) BATTERY MODULE

(71) Applicant: Dr. Ing. h.c. F. Porsche Aktiengesellschaft, Stuttgart (DE)

(72) Inventors: Tim Schmidt, Ludwigsburg (DE); Dietmar Luz, Calw (DE); Jeremy Curnow, Winchester (GB)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 255 days.

(21) Appl. No.: 14/030,493

(22) Filed: Sep. 18, 2013

(65) Prior Publication Data

US 2014/0079974 A1   Mar. 20, 2014

(30) Foreign Application Priority Data

Sep. 18, 2012   (DE) .......................... 10 2012 108 767

(51) Int. Cl.
| | |
|---|---|
| *H01M 6/50* | (2006.01) |
| *H01M 10/6555* | (2014.01) |
| *H01M 10/6551* | (2014.01) |
| *H01M 10/625* | (2014.01) |
| *H01M 10/0525* | (2010.01) |

(52) U.S. Cl.
CPC ...... *H01M 10/5055* (2013.01); *H01M 10/6551* (2015.04); *H01M 10/6555* (2015.04); *H01M 10/0525* (2013.01); *H01M 10/5016* (2013.01); *H01M 10/625* (2015.04); *Y02T 10/7011* (2013.01)

(58) Field of Classification Search
CPC ...................................................... H01M 6/50
See application file for complete search history.

(56) References Cited

U.S. PATENT DOCUMENTS

| | | | |
|---|---|---|---|
| 2006/0216582 A1 | 9/2006 | Lee et al. | |
| 2006/0240318 A1 | 10/2006 | Kim et al. | |
| 2011/0033742 A1* | 2/2011 | Maier | F28F 9/0263 429/120 |
| 2011/0052959 A1* | 3/2011 | Koetting | H01M 10/653 429/120 |
| 2011/0189524 A1 | 8/2011 | Alizon et al. | |
| 2011/0300428 A1 | 12/2011 | Sohn | |
| 2012/0021260 A1* | 1/2012 | Yasui | F28D 15/0275 429/53 |
| 2012/0328916 A1 | 12/2012 | Enning | |

FOREIGN PATENT DOCUMENTS

| | | |
|---|---|---|
| CN | 1848518 | 10/2006 |
| CN | 102270776 | 12/2011 |
| DE | 10 2008 016 936 | 10/2008 |
| DE | 10 2008 034 695 | 1/2010 |
| DE | 10 2009 040 067 | 3/2011 |
| DE | 10 2010 009 478 | 9/2011 |
| DE | 10 2010 009 732 | 9/2011 |
| JP | 2008-181734 | 8/2008 |
| WO | 98/31059 | 7/1998 |

OTHER PUBLICATIONS

Chinese Patent Appl. No. 2013 104246260—Issued on Apr. 30, 2015.
German Search Report of Jun. 17, 2013.

* cited by examiner

*Primary Examiner* — Jacob Marks
(74) *Attorney, Agent, or Firm* — Gerald E. Hespos; Michael J. Porco; Matthew T. Hespos

(57) ABSTRACT

A battery module has at least four battery cells that are cooled via a cooling plate arranged between them. Fins project on the cooling plate and at the same time serve as stops for individual battery cells. As a result, a powerful and very rigid battery module is provided that is of structurally simple construction.

6 Claims, 1 Drawing Sheet

BATTERY MODULE

CROSS REFERENCE TO RELATED APPLICATION

This application claims priority under 35 USC 119 to German Patent Appl. No. 10 2012 108 767.9 filed on Sep. 18, 2013, the entire disclosure of which is incorporated herein by reference.

BACKGROUND

1. Field of the Invention

The invention relates to a battery module having at least four battery cells that are cooled via a cooling plate that is arranged between them. The invention also relates to a motor vehicle equipped with a battery module.

2. Description of the Related Art

DE 10 2008 034 695 B4 discloses a lithium ion battery module of the generic type having battery cells that are connected to one another and a cooling plate arranged on the pole side of the individual cells. The cooling plate has conically shaped cooling mandrels projecting vertically into intermediate spaces laterally of the individual battery cells. The cooling mandrels bear against the battery cell without a gap so that the area is to be increased. Waste heat can be transmitted from the battery cells to the cooling plate via the cooling mandrels.

DE 10 2010 009 478 A1 discloses a vehicle having an electric energy store with storage cells connected in a thermally conducting manner to a cooling plate. Cooling liquid flows through at least one cooling channel integrated into the cooling plate. As a result, the electric energy store can be cooled in a structurally simple way.

U.S. 2006/0240318 discloses a battery module having battery cells mounted on one another in a stack-like manner. Spacer elements are arranged between the individual battery cells and keep the individual battery cells at a spacing from one another so that a coolant can flow between the individual battery cells.

U.S. 2011/0189524 discloses a battery module having battery cells and a cooling plate arranged between the individual battery cells for cooling the battery cells.

WO 98/31059 discloses a battery module having individual battery cells spaced apart from one another and air flows therethrough for cooling purposes.

The invention relates to an improved battery module that achieves effective cooling and high stability.

SUMMARY OF THE INVENTION

The invention relates to cooling battery cells of a battery module via a cooling plate arranged between them. Fins project on the cooling plate and function as stops for individual battery cells and to impart considerably increased rigidity to the cooling plate and therefore for the battery module. The battery module has at least four battery cells that can be cooled via the cooling plate that is arranged between them. Fins project from the cooling plate and preferably at least one fin projects on each side. The fins considerably stiffen the cooling plate in view of their high flexural rigidity. The fins also simplify mounting the battery cells by functioning as a stop for individual battery cells.

The cooling plate preferably has multiple layers, namely two metal sheets that lie on the outside and a plastic insert arranged between them. The metal sheets ensure a high thermal transfer rate from the cooling plate to the individual battery cells. The plastic insert between the metal sheets enables individual cooling channels for a cooling fluid to flow through the cooling plate in a manner that is simple in terms of production technology and at the same time is optimized in terms of weight. The two metal sheets and the plastic insert that lies between them delimit the cooling channels.

The fins preferably project perpendicularly to the outside from the respective metal sheets. The cooling plate itself is usually comparatively easily bendable about a bending axis that lies in the plane of the plate. However, the fin, which projects perpendicularly with respect to the respective metal sheet, increases the bending moment considerably. At the same time, the fins form a stop for the individual battery cells. As a result the battery module produced after fastening the individual battery cells to the cooling plate is structurally extremely rigid and can be cooled effectively, since each battery cell bears with one side over its full surface area against the cooling plate and bears with at least one region of a second side in a planar manner against the respective fin. Thus, the fin can be considered to be both a stiffening rib and a cooling fin.

Four battery cells with the cooling plate arranged between them preferably are held together by a lashing strap. The lashing straps can be made from plastic or from metal and bring about permanent fixing of the individual battery cells on the cooling plate. An exchange of battery cells is possible after releasing the lashing strap. The individual battery cells also can be bonded adhesively or screwed to the cooling plate as an alternative to the lashing strap.

The two metal sheets may be bonded adhesively or welded to the plastic insert that is arranged between them. Producing the cooling plate merely requires connecting the two pre-cut metal sheets to the plastic insert that is arranged between them. Adhesive bonding or welding can achieve a fluid-tight connection.

The above-described battery module preferably is used in a motor vehicle, such as a hybrid or an electric vehicle. Vehicles that are driven by an electric motor or are assisted by electric motor require a comparatively high battery capacity, and high-performance batteries of this type must be cooled for effective operation. The use of the battery module of the invention in a motor vehicle of this type therefore affords the great advantage of obtaining a high electric power output with a comparatively small battery by effective cooling of the battery. The comparatively high inherent rigidity of the battery module avoids the need for special holding devices that had been required previously. Thus, weight can be saved, and installation can be facilitated considerably.

Further important features and advantages of the invention result from the drawings and the associated description.

The features described herein can be used in the specified combination, in other combinations or on their own, without departing from the scope of the invention.

Preferred exemplary embodiments of the invention are shown in the drawings and will be described in greater detail in the following description, wherein identical designations relate to identical or similar or functionally identical components.

DETAILED DESCRIPTION OF THE PREFERRED EMBODIMENTS

Figure 1:
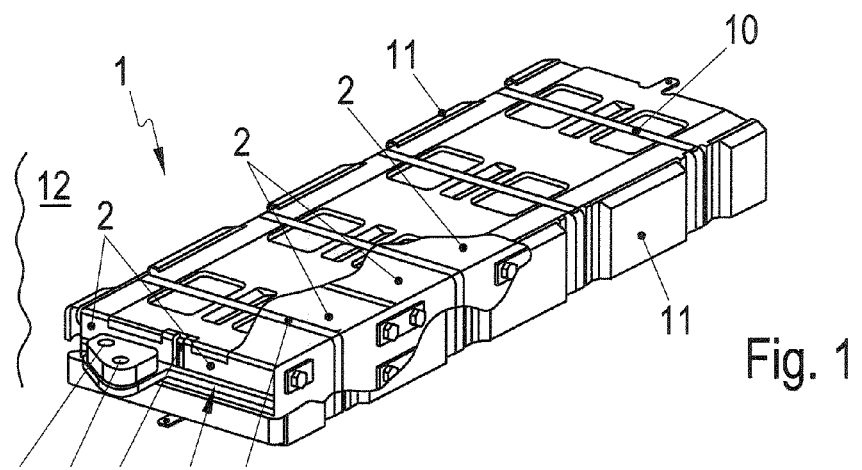
FIG. 1 is a perspective view of a battery module according to the invention.
Figure 2:
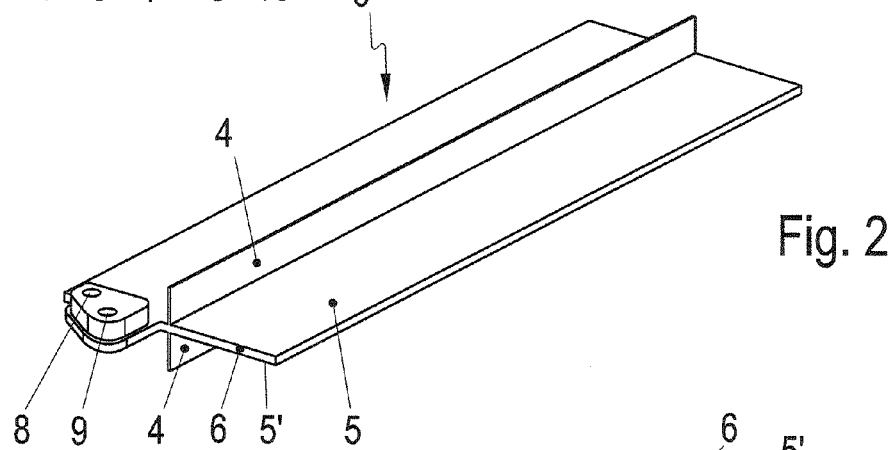
FIG. 2 is a perspective view of a cooling plate of the battery module of FIG. 1.

A battery module 1 according to the invention is identified by the number 1 in FIG. 1. The battery module 1 has a plurality of battery cells 2 that are cooled via a cooling plate 3 arranged between them, as shown in FIGS. 1 and 2. Fins 4 are arranged on the cooling plate 3 and project substantially perpendicularly with respect to the plate plane of the cooling plate 3. The fins 4 stiffen the cooling plate 3, bring about improved cooling of the individual battery cells 2, and function as stops for individual battery cells 2. The battery module 1 therefore is considerably stiffer than conventional battery modules and, moreover, has particularly effective cooling, since the individual battery cells 2 bear with one side in a planar manner against the cooling plate 3 and with an end side in a planar manner against the respective fin 4. As a result, the individual battery cells 2 can be cooled from two sides.

Figure 3:
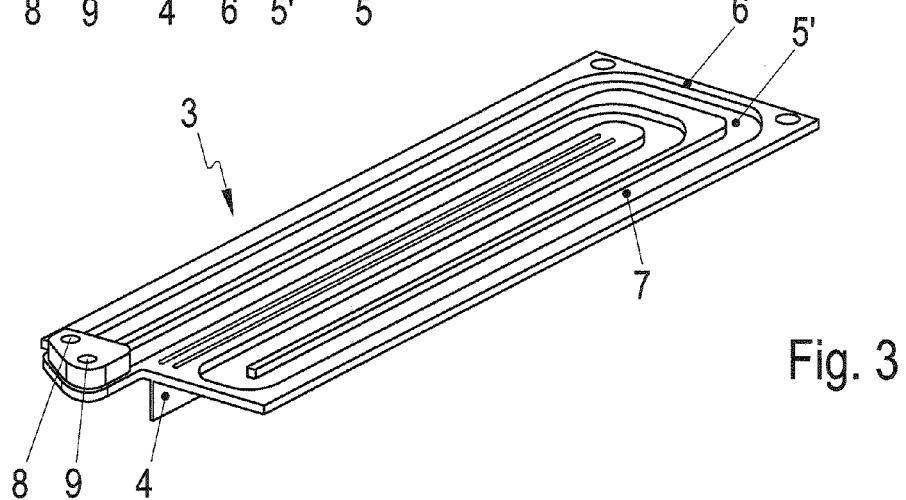
FIG. 3 is a perspective view of the cooling plate without the upper metal sheet.

The cooling plate 3 is constructed from multiple layers, as shown in FIGS. 2 and 3, namely from two metal sheets 5 and 5' that lie on the outside with a plastic insert 6 arranged between them, as shown in FIG. 3. The plastic insert 6, the two metal sheets 5, 5' delimit individual cooling channels 7 that run in the cooling plate 3. The fins 4 project perpendicularly with respect to the plate plane from the respective metal sheets 5, 5' to achieve as high a flexural stiffness of the cooling plate 3 as possible. In addition, the fins 4 run in the longitudinal direction of the rectangular battery module 1 and in each case form a stop for an end side of the battery cells 2.

In addition, an outflow opening 8 and an inflow opening 9 are provided on the end side of the cooling plate 3 for supplying and discharging coolant to and from the cooling plate 3. The individual battery cells 2 can be fastened to the cooling plate 3, for example, via a lashing strap 10, as shown in FIG. 1. Thus, one lashing strap 10 can hold four battery cells 2 with the cooling plate 3 arranged therebetween. The lashing straps 10 can be made, for example, from plastic or from metal and make replacement of individual faulty battery cells 2 possible. Adhesive bonding or screwing of the battery cells 2 to the cooling plate 3 is also conceivable.

The two metal sheets 5, 5' preferably are bonded adhesively or welded to opposite sides of the plastic insert 6 to achieve fluid tight fastening by a reliable and inexpensive joining technology. Poles of the individual battery cells 2 can be covered by corresponding protective caps 11, as shown in FIG. 1. The battery module 1 can be used in a motor vehicle 12, such as a hybrid or electric vehicle where a high-performance cooled battery module 1 is an asset.

In summary, the invention provides a very rigid high performance battery module 1 that can be cooled and can be assembled simply on account of the fins 4, which form stops.

What is claimed is:

1. A hybrid or electric motor vehicle having a battery module, comprising:
    a cooling plate having opposite first and second longitudinal ends and opposite first and second surfaces extending between the ends, first and second fins projecting respectively from the first and second surfaces of the cooling plate and extending from the first longitudinal end to the second longitudinal end, each of the fins having opposite stop surfaces;
    at least two first battery cells formed respectively with first plate engaging surfaces supported on the first surface of the cooling plate on opposite sides of the first fin and further having first fin engaging surfaces supported respectively against the opposite stop surfaces of the first fin; and
    at least two second battery cells formed respectively with second plate engaging surfaces supported on the second surface of the cooling plate on opposite sides of the second fin and further having second fin engaging surfaces supported respectively against the opposite stop surfaces of the second fin, whereby the fins contribute to cooling and positioning the individual battery cells.

2. The hybrid or electric motor vehicle of claim 1, wherein cooling plate comprises a first metal sheet having the first surface and the first fin, a second metal sheet having the second surface and the second fin and a plastic insert arranged between the first and second metal sheets.

3. The hybrid or electric motor vehicle of claim 2, wherein the plastic insert is configured to delimit cooling channels within the plastic insert and between the first and second metal sheets.

4. The hybrid or electric motor vehicle of claim 3, wherein the first and second metal sheets are bonded adhesively or welded to opposite surfaces of the plastic insert.

5. The hybrid or electric motor vehicle of claim 4, wherein each of the cooling channels is formed partly by two opposed surfaces of the plastic insert and partly by a surface of at least one of the first and second sheets.

6. The hybrid or electric motor vehicle of claim 3, further comprising at least one lashing strap extending around the battery cells and the cooling plate and holding the battery cells in contact with the respective first or second surfaces of the cooling plate and with the stop surfaces of the fins.

\* \* \* \* \*